(12) United States Patent
Olds et al.

(10) Patent No.: US 11,089,100 B2
(45) Date of Patent: Aug. 10, 2021

(54) LINK-SERVER CACHING

(71) Applicant: Vivint, Inc., Provo, UT (US)

(72) Inventors: J. T. Olds, Salt Lake City, UT (US); George Shank, Salt Lake City, UT (US); Alen Peacock, Orem, UT (US); Andrew Harding, American Fork, UT (US); Jeff Wendling, West Jordan, UT (US); Ethan Ransom, Orem, UT (US); Mikhail Strizhov, Salt Lake City, UT (US); Erik Nolte, Salt Lake City, UT (US); Dan Willoughby, Kaysville, UT (US); Eric Wollesen, Draper, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/405,095

(22) Filed: Jan. 12, 2017

(65) Prior Publication Data

US 2018/0198862 A1 Jul. 12, 2018

(51) Int. Cl.
*H04L 29/08* (2006.01)
*H04L 29/06* (2006.01)

(52) U.S. Cl.
CPC ........ *H04L 67/1097* (2013.01); *H04L 63/083* (2013.01); *H04L 67/06* (2013.01); *H04L 67/2833* (2013.01); *H04L 67/2842* (2013.01); *H04L 63/0435* (2013.01); *H04L 67/42* (2013.01)

(58) Field of Classification Search
CPC . H04L 67/1097; H04L 67/2842; H04L 67/42; H04L 47/805; H04L 67/02
USPC ........................................................ 709/223
See application file for complete search history.

(56) References Cited

U.S. PATENT DOCUMENTS

| | | | | |
|---|---|---|---|---|
| 6,118,768 A | * | 9/2000 | Bhatia | ................. H04L 12/2856 370/254 |
| 7,610,348 B2 | * | 10/2009 | Kisley | ..................... G06F 3/061 709/212 |
| 7,685,126 B2 | * | 3/2010 | Patel | ................... G06F 11/1076 707/770 |
| 8,260,796 B2 | * | 9/2012 | Mendez | ............ G06F 17/30566 707/758 |

(Continued)

OTHER PUBLICATIONS

International Preliminary Report on Patentability received for PCT Patent Application No. PCT/US17/59364, dated May 9, 2019, 7 pages.

(Continued)

*Primary Examiner* — Umar Cheema
*Assistant Examiner* — John Fan
(74) *Attorney, Agent, or Firm* — Workman Nydegger

(57) ABSTRACT

A computer system for optimizing bandwidth usage within a cloud storage system identifies distinct requests to access a particular digital file. When the number of requests exceeds a threshold, the computer system queries a remote directory server for the particular digital file. The query system then receives, from the remote directory server, addresses to data blocks stored within multiple remote storage nodes. The system requests at least a portion of the addressed data blocks. Upon receiving the blocks, the system decodes the particular digital file from the portion of the addressed data blocks. The computer system then stores the decoded digital file within local memory and communicates the local-area network address to the remote directory server.

20 Claims, 4 Drawing Sheets

(56) References Cited

U.S. PATENT DOCUMENTS

| | | | |
|---|---|---|---|
| 8,825,856 B1* | 9/2014 | Breau | H04L 67/04 |
| | | | 709/226 |
| 2006/0174323 A1 | 8/2006 | Brown et al. | |
| 2008/0208909 A1 | 8/2008 | Rowley | |
| 2009/0225760 A1 | 9/2009 | Foti | |
| 2010/0269008 A1* | 10/2010 | Leggette | G06F 11/1076 |
| | | | 714/752 |
| 2011/0110568 A1 | 5/2011 | Vesper et al. | |
| 2011/0153351 A1 | 6/2011 | Vesper et al. | |
| 2011/0161802 A1 | 6/2011 | Jia et al. | |
| 2011/0225451 A1 | 9/2011 | Leggette et al. | |
| 2013/0097170 A1 | 4/2013 | Flanagan | |
| 2013/0204849 A1 | 8/2013 | Chacko | |
| 2013/0246568 A1 | 9/2013 | Chesterfield | |
| 2013/0339407 A1* | 12/2013 | Sharpe | G06F 17/30194 |
| | | | 707/827 |
| 2013/0346795 A1 | 12/2013 | Gladwin et al. | |
| 2014/0006465 A1* | 1/2014 | Davis | G06F 17/30194 |
| | | | 707/827 |
| 2014/0068224 A1 | 3/2014 | Fan et al. | |
| 2014/0218517 A1 | 8/2014 | Kim et al. | |
| 2014/0250006 A1 | 9/2014 | Makhotin et al. | |
| 2015/0039645 A1 | 2/2015 | Lewis | |
| 2015/0220284 A1 | 8/2015 | Wright | |
| 2015/0378827 A1 | 12/2015 | Grube et al. | |
| 2016/0028607 A1 | 1/2016 | Weill et al. | |
| 2016/0165663 A1 | 6/2016 | Shanmugam et al. | |
| 2016/0344745 A1 | 11/2016 | Johnson et al. | |
| 2017/0346853 A1 | 11/2017 | Wyatt et al. | |
| 2018/0124188 A1 | 5/2018 | Olds et al. | |

OTHER PUBLICATIONS

International Search Report and Written Opinion received for PCT Patent Application No. PCT/US17/59364, dated Jan. 26, 2018, 7 pages.

\* cited by examiner

LINK-SERVER CACHING

BACKGROUND

Computers and computing systems have affected nearly every aspect of modern living. Computers are generally involved in work, recreation, healthcare, transportation, entertainment, household management, etc.

Computing system functionality can be enhanced by a computing systems' ability to be interconnected to other computing systems via network connections. Network connections may include, but are not limited to, connections via wired or wireless Ethernet, cellular connections, or even computer-to-computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Many computers are intended to be used by direct user interaction with the computer. As such, computers have input hardware and software user interfaces to facilitate user interaction. For example, a modern general-purpose computer may include a keyboard, mouse, touchpad, camera, etc. for allowing a user to input data into the computer. In addition, various software user interfaces may be available.

Examples of software user interfaces include graphical user interfaces, text command line based user interfaces, function key or hot key user interfaces, and the like.

In recent years, the use of cloud storage has gained significant popularity due to its ease of use, pervasive access, and security. For example, files stored within the cloud are often available to users through their computers, smart phones, or through any generic web browser. Additionally, files stored within the cloud are often stored within professional quality server farms that utilize various methods of data protection and redundancy, including, but not limited to, RAID configurations, data verification, advanced filesystems, and other similar technologies.

While cloud storage has provided significant benefits to end users, it comes at a high cost in bandwidth and hardware to the cloud providers. Cloud providers are conventionally required to purchase and continually update expensive storage arrays—that must also be redundant. Similarly, cloud providers are conventionally required to purchase and maintain large amounts of bandwidth so that users can quickly download large files that may be stored within their cloud accounts. As such, there is significant interest in addressing the technical challenges relating to efficient cloud storage.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein include computer systems, methods, and computer readable media for optimizing bandwidth usage within a local-network. An exemplary computer system is configured to identify, within a local-area network, one or more distinct requests to access a particular digital file. Each distinct request is associated with a different user device. When a number of the one or more distinct requests exceeds a threshold, the computer system queries a remote directory server for the particular digital file. The computer system then receives, from the remote directory server, addresses to data blocks stored within multiple remote storage nodes.

The computer system requests, from at least a portion of the remote storage nodes, at least a portion of the addressed data blocks. Upon receiving the data blocks, the computer system decodes the particular digital file from the portion of the addressed data blocks. Decoding the particular digital file comprises rebuilding at least a portion of the particular digital file using parity information associated with the portion of the addressed data blocks.

The computer system stores the decoded digital file within local memory. The local memory is located within the local-area network. Additionally, the decoded digital file is associated with a local-area network address. The computer system then communicates the local-area network address to the remote directory server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
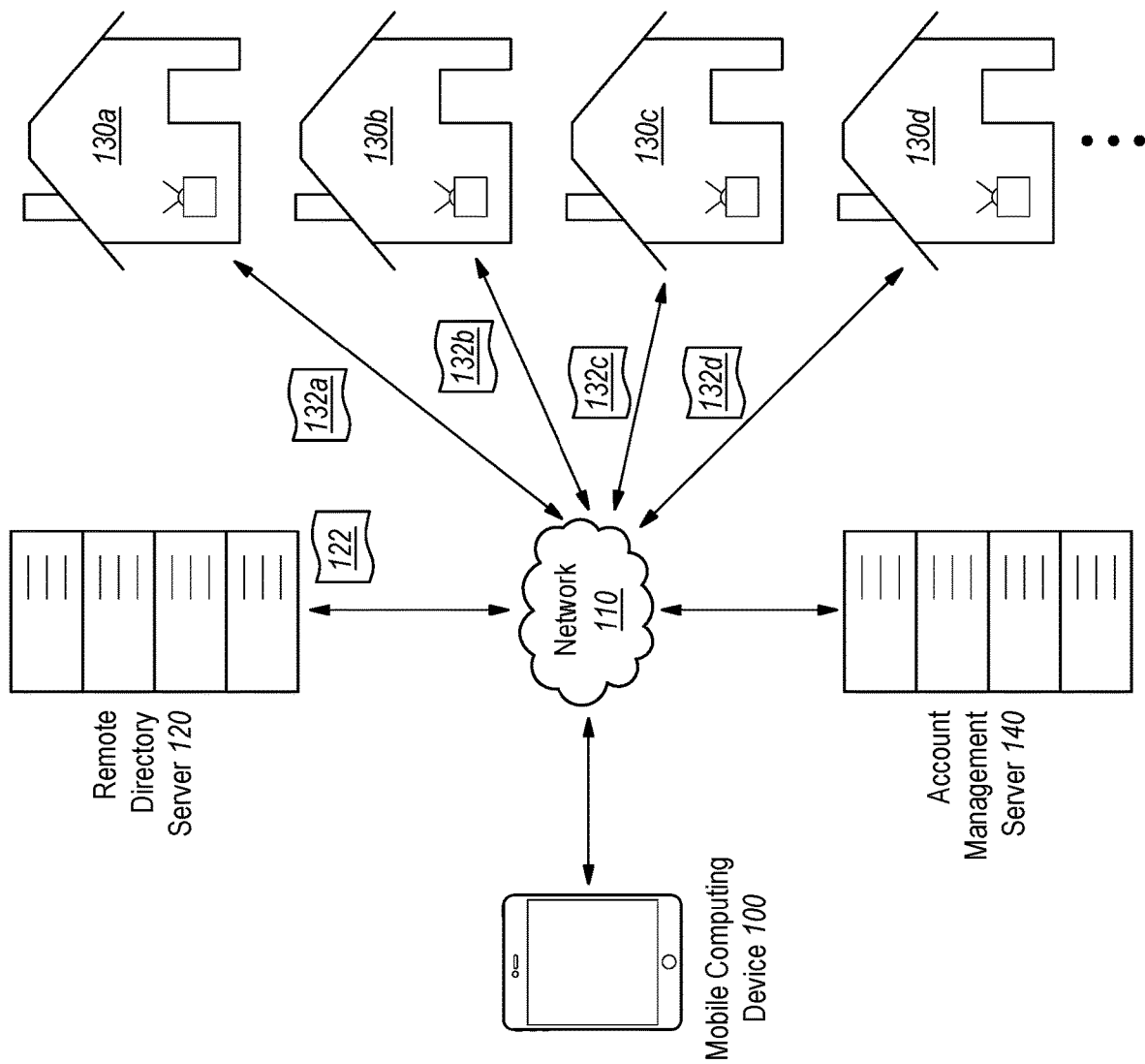
FIG. 1 illustrates a schematic of an embodiment of a system for optimizing bandwidth usage within a cloud storage system.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Embodiments disclosed herein provide methods and systems for optimizing bandwidth usage within a cloud storage system. In particular, disclosed embodiments intelligently cache and link files locally. The intelligent caching and linking can provide significant benefits to managing bandwidth by intelligently minimizing strain on a local-area network's connection to the Internet.

Disclosed embodiments in computer systems are configured to intelligently select one or more data blocks from multiple remote storage nodes. In at least one embodiment, when a threshold number of requests for a digital file are generated, the computer system retrieves and locally caches one or more data blocks associated with the requested digital file. The computer system may decode the digital file from the one or more data blocks, or alternatively, the computer system may store the encoded one or more data blocks such that the data is still encrypted.

Further, in at least one embodiment, the computer system dynamically adjusts the number of threshold requests required to initiate a local caching of one or more data blocks associated with the digital file. For example, each of the data blocks may be stored at a different remote storage node. Additionally, each remote storage node may have unique bandwidth constraints. As such, some remote storage nodes may provide relatively low latency, fast downloads, while other remote storage nodes may act as bottle necks due to their slow network connections or high latency.

In at least one embodiment, the computer system dynamically adjusts the number of threshold requests required to initiate a local caching of one or more data blocks associated with the digital file on a remote storage node basis. For instance, the computer system may generate different thresholds for one or more of the remote storage nodes based upon the connection speed between the computer system and the remote storage node.

As such, the computer system may identify multiple requests over time for a particular digital file. The computer system may further identify that data blocks associated with the particular digital file are stored on a particular set of remote storage nodes. As the data blocks are downloaded, the computer system monitors the connection speed and latency of each connection to each remote storage node. The computer system sets a per-remote-storage-node threshold based upon the speed and latency of the particular connection. When the threshold is exceeded, the computer system downloads and stores locally the data block from that particular remote storage node. The computer system then updates a remote directory server such that requests from the local-area network for the data block are re-directed to the locally stored data block. Accordingly, in at least one embodiment, the computer system downloads and locally caches only a portion of the data blocks required for reconstructing a digital file.

Figure 2:
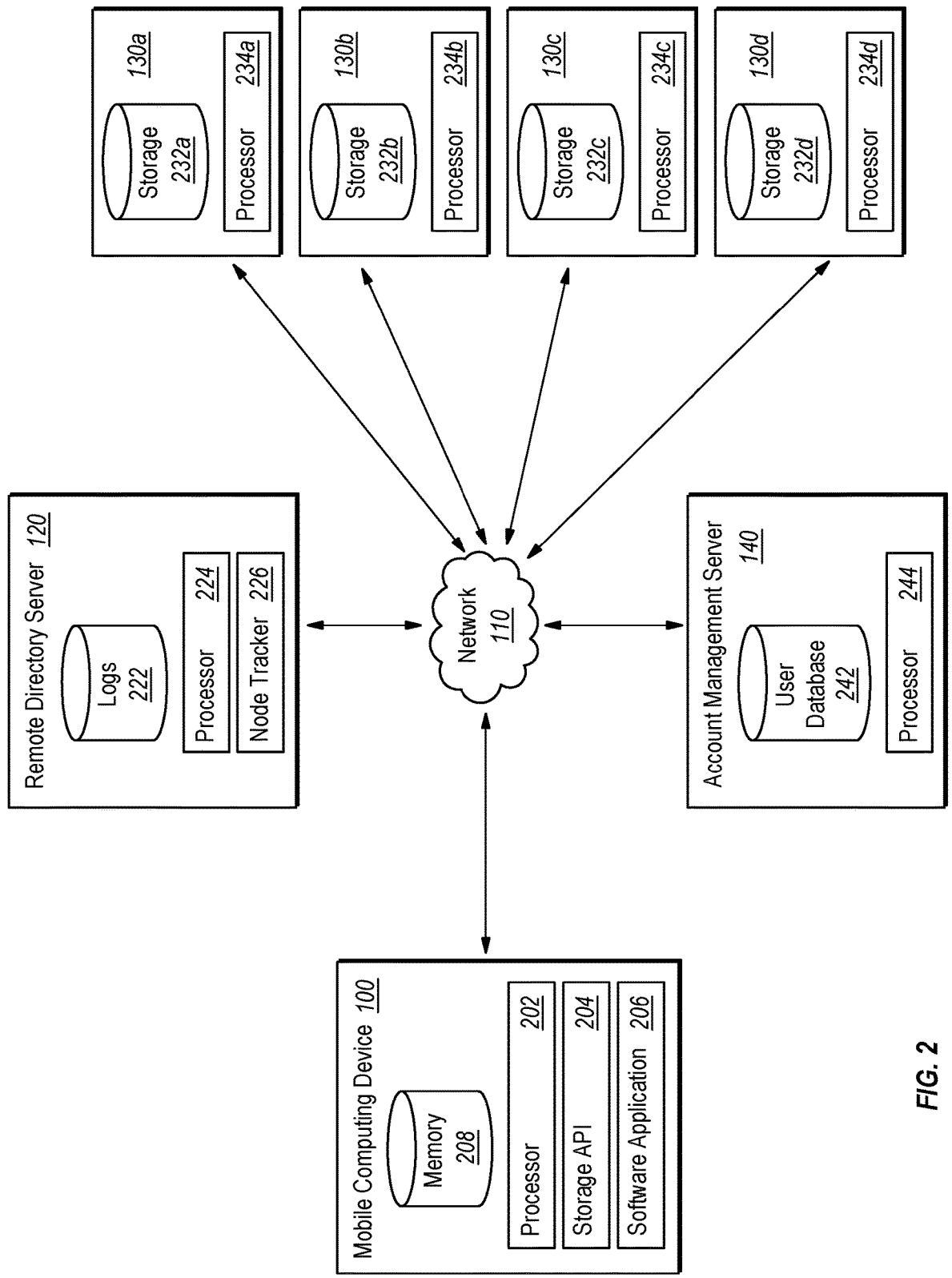
FIG. 2 illustrates a schematic of another embodiment of a system for optimizing bandwidth usage within a cloud storage system.

Turning now to the figures, FIGS. 1 and 2 illustrate schematics of an embodiment of a system for optimizing bandwidth usage within a cloud storage system. FIG. 1 depicts a hardware-based schematic that illustrates different hardware components within the system, while FIG. 2 illustrates a module-based schematic that illustrates modules within hardware components. As depicted, a mobile computing device 100 communicates, through a network connection 110, with a remote directory server 120, an account management server 140, and various remote storage nodes 130(*a-d*).

One will understand that the depicted components of FIGS. 1 and 2 are provided for the sake of example and clarity. In various additional or alternative embodiments, different configurations and combinations of components are used. For example, the mobile computing device 100 can comprise a smart phone, a tablet computer, a laptop computer, a desktop computer, an embedded device, or any other device capable of processing digital information and communicating over a network. Similarly, the account management server 140 and the remote directory server 120 may be combined within a single server or distributed between multiple distinct servers.

Additionally, as used herein, a remote storage node comprises individual nodes within a distributed storage system. For example, the remote storage nodes may comprise individual computing units within different respective houses. In particular, the remote storage nodes may comprise a home server or home-based embedded device. For instance, in at least one embodiment, the remote storage nodes comprise home-based media storage devices that are configured to store the home owner's multimedia collection. As such, embodiments disclosed herein are configured to utilize excess space within home-based computing systems by forming a distributed cloud that leverages multiple remote storage nodes.

In at least one embodiment, the mobile computing device 100 comprises a computer system for optimizing bandwidth usage within a cloud storage system. In particular, the mobile computing device 100 comprises one or more processors and one or more computer-readable media having stored thereon executable instructions that when executed by the one or more processors configure the computer system to perform various acts. The acts include receiving a request, through an application program interface 204, to store a digital file.

In at least one embodiment, the request is generated by a software application 206 that is executed on the mobile computing device 100. For example, the mobile computing device 100 may execute a photo editing software application 206 that stores photos within the cloud. To initialize the storage of the photo, the photo editing software application 206 communicates the file to a storage API 204.

Upon receiving the file, or an address to the file, the processor 202 accesses the file within memory 208 and encodes the digital file into a set of multiple distinct blocks of data. The multiple distinct blocks of data each comprise a retrievable portion of the digital file, and the set of multiple distinct blocks of data comprises parity information (e.g., error-correction coding). In at least one embodiment, the processor 202 encodes the data using a Reed-Solomon algorithm. Additionally, in at least one additional or alternative embodiment, before encoding the data file, the processor 202 encrypts the digital file and stores the associated encryption key locally. Encrypting the file can protect the user's data while the data is stored in the cloud.

In at least one additional or alternative embodiment, the processor 202 communicates an authentication credential to an account management server 140. Upon receiving the authentication credential, a processor 244 within the account management server 140 accesses a user database 242 and validates the user's authentication credential. If the user's authentication credential is valid, the processor 244 transmits to the mobile computing device 100 a credential necessary for storing data within the cloud. In particular, in at least one embodiment, after being authenticated at the account management server 140, the processor 202 at the mobile computing device 100 receives a credential necessary for accessing the remote directory server 120. In an additional or alternative embodiment, the processor 202 receives a credential necessary for accessing one or more of the remote storage nodes 130(*a-d*). Accordingly, in at least one embodiment, the ability to store data within the cloud is controlled by an account management server 140.

The processor 202 then transmits the set of multiple distinct blocks 132(*a-d*) of data to multiple remote storage nodes 130(*a-d*). Specifically, the multiple distinct blocks 132(*a-d*) of data are divided among at least a portion of the remote storage nodes 130(*a-d*). In at least one embodiment, the mobile computing device 100 stores, within memory 208, a list of available remote storage nodes 130(*a-d*). In an additional or alternative embodiment, before transmitting the set of multiple distinct blocks of data 132(*a-d*) to multiple remote storage nodes 130(*a-d*), the processor 202 requests from the remote directory server 120 a set of remote storage nodes 130(*a-d*) available for storage and internet protocol addresses 122 associated with each available remote storage node. Accordingly, there are various different means through which the processor 202 can identify available remote storage nodes 130(*a-d*).

The remote directory server 120 utilizes a node tracker component 226 to identify nodes that are currently available. As used herein, a remote storage node (e.g., 130*a*) is available when it is connected to the network 110 and comprises sufficient available storage space to store the file. Additionally, in at least one embodiment, a remote storage node 130*a* is available when the remote directory server determines that the user who is requesting to store the file has permissions to access the particular remote storage node 130*a*. For example, as will be explained more fully herein, in at least one embodiment, multiple different users can utilize the same cloud storage service. In such a case, it may be desirable to physically isolate users' data.

In at least one embodiment, the processor 202 also generates a log that comprises identification information associated with the digital file and an address for each respective block of data within each respective remote storage node. For example, the log may comprise a file name associated with the digital file and an IP address for each remote storage node 130(*a-d*) that was used to store blocks of data associated with the digital file. Additionally, the log may comprise an address for the location of the respective data blocks within each of the remote storage nodes 130(*a-d*).

The processor 202 transmits the log to the remote directory server 120. In at least one embodiment, the remote directory server 120 comprises multiple different logs 222 that map multiple different digital files to the remote storage nodes. Using the logs 222, one or more users can identify a desired file and request the file from the associated remote storage nodes 130(*a-d*).

For example, in at least one embodiment, a computer system, such as the mobile computing device 100 receives a request, through an application program interface (API), to access a digital file. The request may be generated by a software application 206, such as a photo editing software application 206, to access a photo stored within the cloud. In particular, the photo editing software application 206 may generate a request for the digital file through the storage API 204.

In response to receiving the query through the storage API 204, the processor 202 queries a remote directory server 120 for the digital file. The remote directory server 120 identifies within its logs 222 addresses to data blocks associated with the requested file that are stored within multiple remote storage nodes. In at least one embodiment, the remote directory server 120 then utilizes a node tracker component 226 to identify which of the respective remote storage nodes are currently available.

In at least one embodiment, an available remote storage node 130(*a*) comprises a storage node with up-to-date content. For example, the node tracker 226 within the remote directory server 120 can track the current version of data across the remote storage nodes 130(*a-d*). For instance, a digital file within the cloud may be updated during a time when one or more remote storage nodes 130(*a-d*) are not available. As such, the unavailable remote storage nodes 130(*a-d*) may not comprise the most recently updated version of the file. In such a case, the remote directory server 120 excludes data blocks associated with outdated versions and only returns addresses to remote storage nodes 130(*a-d*) that have the most up-to-date versions of the file.

Further, in at least one embodiment, when a processor 202 is not able to update all of the remote storage nodes 130(*a-d*) with the most recent changes to a file, the processor 202 saves the updated data blocks associated with the unavailable remote storage nodes within memory 208. The processor 202 then periodically polls the previously unavailable remote storage nodes to determine if they are now available. As each remote storage node becomes available, the processor 202 retrieves the respective data blocks from memory 208 and transmits them to the appropriate remote storage node (e.g., 130*a*).

In contrast, to the above, in at least one embodiment, when a processor 202 is not able to update all of the remote storage nodes 130(*a-d*) with the most recent changes to a file, the processor 202 transmits the updated data blacks associated with the unavailable remote storage nodes 130 (*a-d*) to the remote directory server 120, or some other associated server. The node tracker 226 then polls the previously unavailable remote storage nodes and updates them as they become available.

Upon identifying available remote storage nodes, the remote directory server 120 sends to the processor 202 addresses to data blocks stored within multiple available remote storage nodes. The addresses comprise at least IP addresses for accessing the remote storage nodes.

The processor 202 then requests, from at least a portion of the remote storage nodes 130(*a-d*), at least a portion of the addressed data blocks. In at least one embodiment, the processor 202 receives addresses to only available remote storage nodes 130(*a-d*).

Upon receiving the data blocks from the remote storage nodes 130(a-d), the processor decodes the digital file from the portion of the addressed data blocks. In at least one embodiment, decoding the digital file comprises rebuilding at least a portion of the digital file using parity information associated with the portion of the addressed data blocks. For example, one or more remote storage nodes that contain data blocks associated with the digital file may be unavailable. In such a circumstance, the processor 202 utilizes error-correction coding algorithms along with parity information in the received data blocks to rebuild the missing data. In at least one embodiment, the processor 202 utilizes a Reed-Solomon algorithm to rebuild the missing data. After rebuilding the file, the processor 202 communicates the decoded digital file to a requester—in this case the photo editing software application 206.

Additionally, in at least one embodiment, the processor 202 also decrypts the data within the data blocks. In particular, the processor 202 accesses a decryption key that is provided by a user or stored within memory 208 and decrypts the received data. As stated above, encrypting and decrypting the data using a key stored or received locally at the mobile computing device 100 adds additional security to the cloud storage by preventing other users from accessing the data stored in the cloud.

Figure 3:
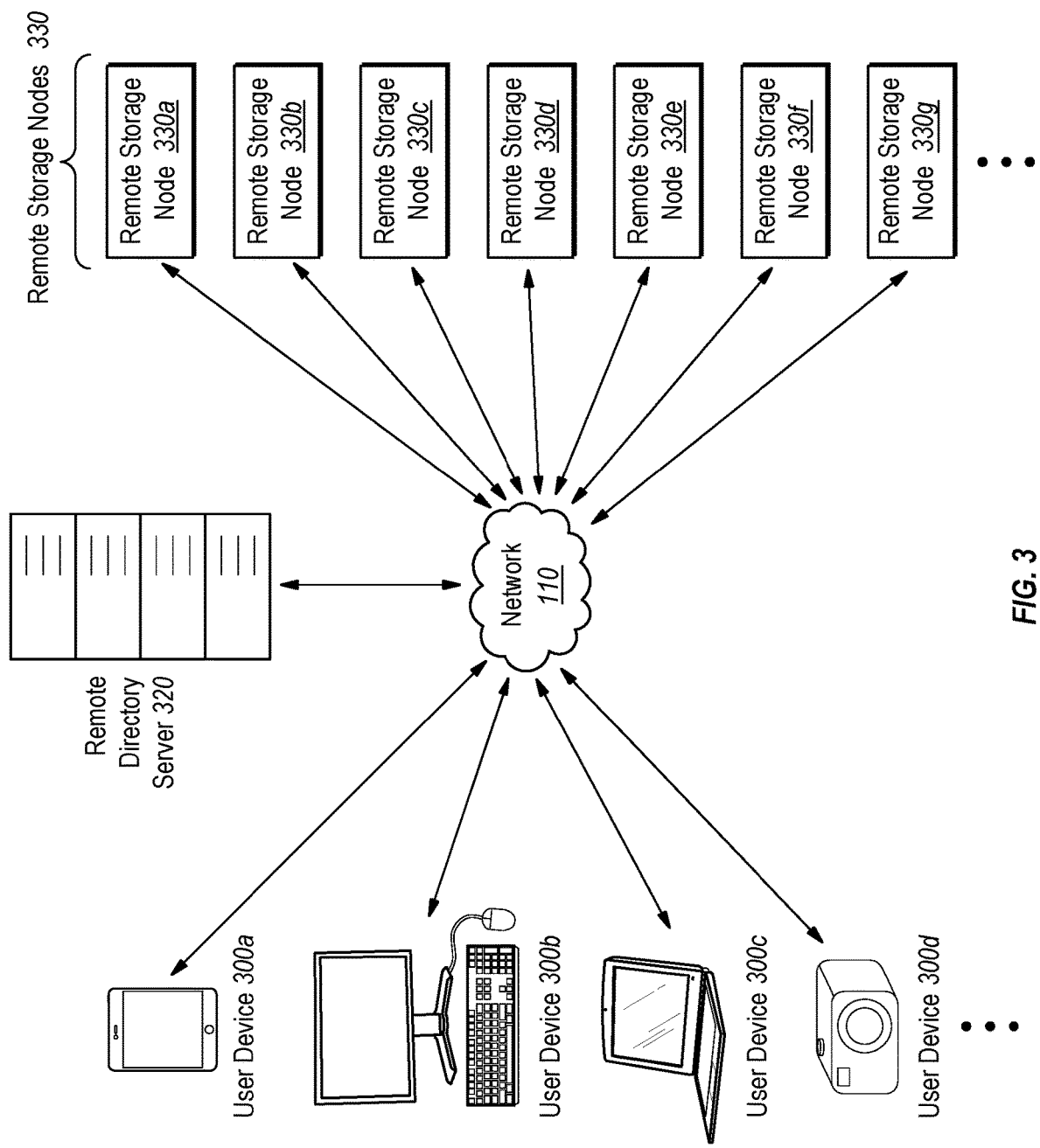
FIG. 3 illustrates a schematic of yet another embodiment of another system for optimizing bandwidth usage within a cloud storage system.

In various additional or alternative embodiments, further methods and systems are implemented to optimize network bandwidth usage. For example, FIG. 3 illustrates a schematic of yet another embodiment of another system for optimizing bandwidth usage within a cloud storage system. In particular, FIG. 3 depicts multiple different user devices 300(a-d) making requests through a network 110. The network 110 connects the multiple different user devices 300(a-d) to various remote storage nodes 330.

In at least one embodiment, files stored within the remote storage nodes 300(a-d) are shared assets, such that multiple different users may access the same stored file. For example, a user may store a family photo album within the remote storage nodes 300(a-d). The user may further desire to share the family photo album with family members and friends. In such a circumstance, it may optimize bandwidth to place the entire file, or certain data blocks that are associated with the file in specific storage nodes.

For instance, in at least one embodiment, at least a portion of the multiple different user devices 300(a-d) are located within the same local-area network and are all requesting access to the family photo album. Additionally, in at least one embodiment, one of the remote storage nodes (e.g., remote storage node 330a) is also located within the same local-area network as the multiple different user devices 300(a-d). As such, the remote storage node 330a is not remote from the multiple different user devices 300(a-d), but is instead remote from the other remote storage nodes 330.

In at least one embodiment, upon identifying that the multiple different user devices 300(a-d) are requesting the same file, the remote storage node 330a requests from at least a portion of the other remote storage nodes 330(b-g) at least a portion of the data blocks associated with the family photo album file. The remote storage node 330a then stores the entire family album or multiple data blocks associated with the family photo album locally. The remote storage node 330a also communicates the updated locations to the remote directory server 320. Future requests for the family photo album that are generated within the local-area network are directed by the remote directory server 320 towards remote storage node 330a. In contrast, at least some requests for the family photo album generated outside the local-area network are directed to one or more of the remote storage nodes 330. Accordingly, the multiple different user devices 300(a-d) are then able to download the photo album or data blocks from the remote storage node 300a that is within the same local-area network, as opposed to the typically slower process of downloading across networks.

In at least one embodiment, the remote storage node 330a identifies, within the local-area network, one or more distinct requests to access a particular digital file (e.g. the family photo album). Further, each distinct request is associated with a different user device. The remote storage node 330 may handle all requests between the local-area network and the remote directory server 320.

In at least one embodiment, during the communications between the local-area network and the remote directory server 320, the remote storage node 330a tracks the particular file being requested and the particular users who are making the requests. In contrast, in an alternative or additional embodiment, the remote directory server 320 tracks the particular file being requested, the particular users who are making the requests, and the location of the particular users. As needed, the remote directory server 320 then passes this information onto the remote storage node 330a.

When a number of the one or more distinct requests exceeds a threshold, the remote storage node 330a queries the remote directory server 320 for addresses to the data blocks associated with the particular digital file. The threshold may be set by a user, set by an administrator of the remote directory server 320, or adaptively set by a remote storage node 330a based upon current network conditions. For example, in at least one embodiment, the threshold is exceeded as soon as a second device requests the same digital file within a particular time period, such as an hour. In contrast, in at least one embodiment, a user specifies the threshold such that the user controls the optimization of the network bandwidth. In at least one embodiment, the remote storage node 330a sets the threshold based upon the amount of time it took to originally access all of the data blocks associated with the particular file. Specifically, the longer it took to access all of the data blocks the lower the threshold is set for that particular file. As such, different files may have different thresholds that are dependent upon where the respective data blocks for the different files are stored.

The remote storage node 330a then receives, from the remote directory server, 320, addresses to data blocks stored within multiple remote storage nodes 330. Using the received addresses, the remote storage node 330a requests, from at least a portion of the remote storage nodes 330, at least a portion of the addressed data blocks. For example, in at least one embodiment, the remote storage node 330a may not request all of the data blocks associated with the digital file. Instead, the remote storage node 330a may only request the data blocks from remote storage nodes 330(b-g) with relatively slow connection speeds. Alternatively or additionally, the remote storage node 330a only requests the minimum number of data blocks needed to rebuild the digital file using the parity information. As such, the remote storage node 330a may only store a portion of the total data blocks. A user device 300a that requests the digital file may then be provided with links to a portion of the data blocks that are stored locally within remote storage node 330a and links to other remote storage nodes 330(b-g). Additionally, the user device 300a may be required to use parity information to reconstruct the entire digital file from only a portion of the data blocks.

In at least one embodiment, the remote storage node 330a stores only a portion of the addressed data blocks within local memory. For example, the remote storage node 330a may only store data blocks that are associated with remote storage nodes 330 with slow connections. When a particular remote storage node (e.g., remote storage node 330b) drops below a specific connection speed and the number of distinct users requesting the digital file exceeds the threshold, the remote storage node 330a downloads the data blocks from remote storage node 330b, while leaving the data blocks remaining at the other remote storage nodes 330(*c-g*). As such, the remote storage node 330a has only downloaded a portion of the data blocks, and the downloaded portion may be insufficient to completely reconstruct the digital file without additional data blocks from other remote storage nodes 330(*c-g*). The user device 300a is then able to download the other data blocks from the other remote storage nodes 330(*c-g*) while accessing the locally stored portion of data blocks much more quickly than would have been possible from the slower remote storage node 330b.

Accordingly, in at least one embodiment, a user device 300a requests the digital file associated with the stored data blocks. The remote storage node 330a receives a request from the user device 300a to download a first subset of the addressed data blocks, which may only be a portion, or subset, of the data blocks associated with the digital file. The remote storage node 330a identifies the first subset within the locally stored portion of the addressed data blocks and transmits the first subset of the addressed data blocks to the first user device.

In at least one embodiment, the user device 300a initially or later downloads a second subset of the one or more addressed data blocks from the multiple remote storage nodes 330(*b-g*). The one or more addressed data blocks of the second subset are exclusive from the one or more addressed data blocks of the first subset. For example, the first subset of data blocks comprises data blocks from slower remote storage nodes 330 that were downloaded locally, while the second subset of data blocks comprises data blocks that are directly downloaded from the other remote storage nodes 330.

Once the data blocks are downloaded, either the user device 300a or the remote storage node 330a decodes the particular digital file from the portion of the addressed data blocks. In at least one embodiment, decoding the particular digital file comprises rebuilding at least a portion of the particular digital file using parity information associated with the portion of the addressed data blocks. The remote storage node 330a then stores the decoded digital file within local memory (e.g., local memory 232a shown in FIG. 2). The local memory is located within the local-area network, and the decoded digital file is associated with a local-area network address. The remote storage node 330a then communicates the local-area network address to the remote directory server. As such, other user devices 300(*b-d*) that are within the same local-area network and that query the remote directory server 320 for the digital file are directed to the local-area network address.

Accordingly, disclosed embodiments include methods and systems for optimizing bandwidth within a distributed cloud network. In particular, disclosed embodiments increase bandwidth efficiency by intelligently moving at least portions of a target digital file to storage within the local-area network. As such, the use of external bandwidth which is typically far costlier and much slower than local bandwidth is minimized.

Additionally, in at least one embodiment, disclosed embodiments increase bandwidth efficiency by dynamically selecting remote storage nodes to retrieve data from. For example, user device 300a may request a digital file that is stored at remote storage nodes 330a, 330b, 330c, and 330d. Upon connecting to each remote storage node 330a, 330b, 330c, and 330d, the user device 300a may determine that the connection to storage node 330d is substantially slower than the connection to the other remote storage nodes 330a, 330b, 330c. In such a case, instead of waiting for the data blocks to download from remote storage node 330d, the user device 300a may simply drop the connection to remote storage node 330d and recover the digital file using error-correction coding and the data stored in remote storage nodes 330a, 330b, and 330c. Accordingly, in at least one embodiment, a user device 300a dynamically determines whether it is faster to download data blocks from a collection of remote storage nodes 330 or to download only a portion of the data blocks from a subset of the remote storage nodes 330 and recover the entire digital file using error-correction coding.

One will appreciate that embodiments disclosed herein can also be described in terms of flowcharts comprising one or more acts for accomplishing a particular result. For example, FIG. 4 and the corresponding text describe acts in various methods and systems for optimizing bandwidth usage within a cloud storage system. The acts of FIG. 4 are described below.

Figure 4:
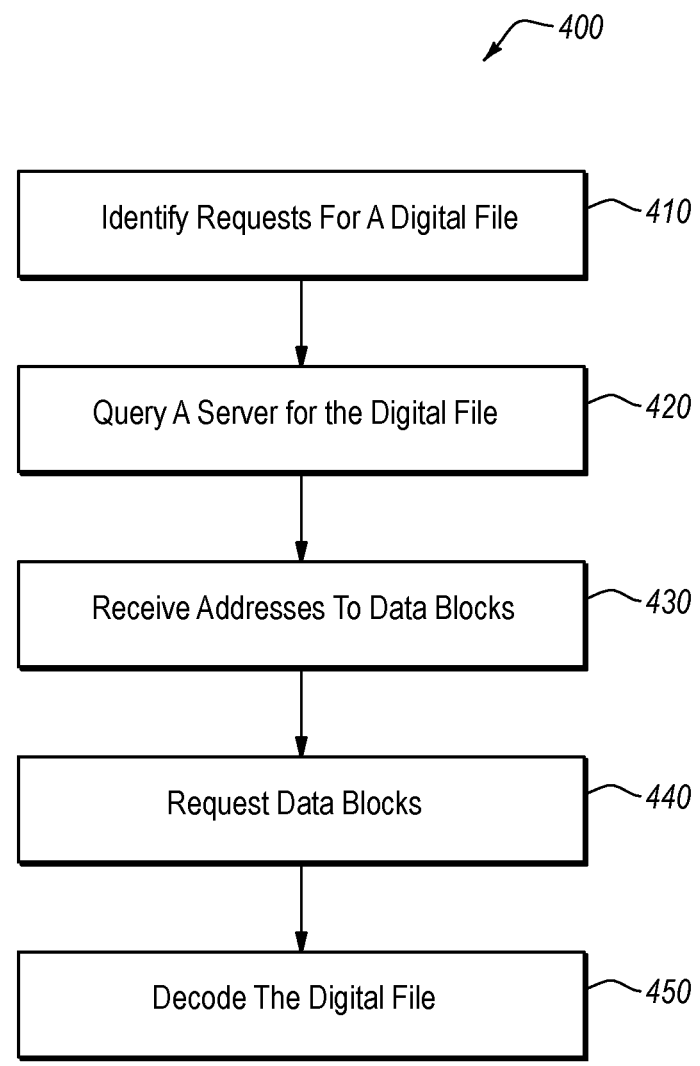
FIG. 4 illustrates a flow chart of an embodiment of a method for optimizing bandwidth usage within a cloud storage system.

For example, FIG. 4 illustrates that a flow chart of an embodiment of a method 400 for optimizing bandwidth usage within a cloud storage system can comprise act 410 of identifying requests for a digital file. Act 410 includes identifying, within a local-area network, one or more distinct requests to access a particular digital file, wherein each distinct request is associated with a different user device. For example, as depicted and described with respect to FIG. 3, a remote storage node 330a that is within the local-area network is capable of identifying requests that are generated by user devices 300(*a-d*) within the local-area network.

Additionally, FIG. 4 illustrates that the method 400 comprises an act 420 of querying a server for the digital file. Act 420 includes when a number of the one or more distinct requests exceeds a threshold, querying a remote directory server for the particular digital file. For example, as depicted and described with respect to FIG. 3, when the remote storage node (e.g., remote storage node 330a) identifies that more than a threshold number of user devices 300(*a-d*) are requesting a particular digital file, the remote storage node queries the remote directory server 320 for the particular digital file.

FIG. 4 also illustrates that the method 400 comprises an act 430 of receiving addresses to data blocks. Act 430 includes receiving, from the remote directory server, addresses to data blocks stored within multiple remote storage nodes. For example, as depicted and described with respect to FIG. 3, remote storage node 330a receives from the remote directory server 320 addresses to data blocks that are stored within the other remote storage nodes (e.g., remote storage nodes 300(*b-g*)).

Further, FIG. 4 illustrates that the method 400 comprises an act 440 of requesting data blocks. Act 440 includes requesting, from at least a portion of the remote storage nodes, at least a portion of the addressed data blocks. For example, as depicted and described with respect to FIG. 3, remote storage node 330a requests at least a portion of the data blocks that are stored within the other remote storage nodes (e.g., remote storage nodes 300(*b-g*)).

Further still, FIG. 4 illustrates that the method 400 comprises an act 450 of decoding the digital file. Act 450 includes decoding the particular digital file from the portion of the addressed data blocks. Decoding the particular digital file comprises rebuilding at least a portion of the particular digital file using parity information associated with the portion of the addressed data blocks and storing the decoded digital file within local memory. The local memory is located within the local-area network, and the decoded digital file is associated with a local-area network address. For example, as depicted and described with respect to FIGS. 2 and 3, the remote storage node 330a decodes the digital file and stores the digital file within local memory (e.g., storage 232a in FIG. 2). The remote storage node 330a also identifies a local-area network address associated with the particular digital file.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general-purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general-purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general-purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for optimizing bandwidth usage within a local-network, comprising:
   one or more processors; and
   one or more computer-readable media having stored thereon executable instructions that when executed by the one or more processors configure the computer system to perform at least the following:
   identify, within a local-area network, one or more distinct requests to access a particular digital file, wherein:
      each distinct request is associated with a different user device, and
      the particular digital file is composed of multiple data blocks that are independently stored in multiple remote storage nodes, wherein the multiple remote storage nodes are remote to each other;

generate per-remote-storage-node thresholds for at least a portion of the multiple remote storage nodes, wherein a particular remote storage node selected from the multiple remote storage nodes is associated with a particular per-remote-storage-node threshold that is different than the per-remote-storage-node thresholds associated with at least one other remote storage node selection from the multiple remote storage nodes;

when a number of the one or more distinct requests exceeds the particular per-remote-storage-node threshold for the particular remote storage node, query a remote directory server for the particular digital file;

receive, from the remote directory server, addresses to the multiple data blocks stored within the multiple remote storage nodes, including at least the particular remote storage node;

identify a set of slower storage nodes, including at least the particular remote storage node, selected from the multiple remote storage nodes, that are associated with slower connection speeds relative to the other remote storage nodes within the multiple remote storage nodes, wherein the set of slower storage nodes comprise a particular set of data blocks from within the multiple data blocks;

request, from the set of slower storage nodes, including at least the particular remote storage node, the particular set of data blocks;

decode the particular digital file from the particular set of data blocks, wherein decoding the particular digital file comprises rebuilding at least a portion of the particular digital file using parity information associated with the particular set of data blocks; and store the decoded digital file within local memory, wherein:
the local memory is located within the local-area network, and
the decoded digital file is associated with a local-area network address.

2. The computer system as recited in claim 1, wherein the executable instructions include instructions that are executable to configure the computer system to:
receive a request to access the particular digital file from one or more user devices; and
transmit the particular digital file to the one or more user devices.

3. The computer system as recited in claim 1, wherein the executable instructions include instructions that are executable to configure the computer system to:
store the particular set of data blocks within local memory;
receive a request from a first user device to download a first subset of the multiple data blocks;
identify the first subset within the particular set of data blocks; and
transmit the first subset of the particular set of data blocks to the first user device.

4. The computer system as recited in claim 3, wherein:
the first user device initially downloaded a second subset of the multiple data blocks from the multiple remote storage nodes; and
data blocks within the second subset being exclusive from the one or more addressed data blocks of the first subset.

5. The computer system as recited in claim 1, wherein the digital file is decoded using a Reed-Solomon algorithm.

6. The computer system as recited in claim 1, wherein the remote directory server tracks versions associated with each block of data that is stored at each remote storage node.

7. The computer system as recited in claim 6, wherein the received addresses exclude data blocks associated with outdated versions.

8. The computer system as recited in claim 1, wherein the executable instructions include instructions that are executable to configure the computer system to:
after decoding the digital file, access a locally stored encryption key, and
decrypt the digital file.

9. The computer system as recited in claim 1, wherein the executable instructions include instructions that are executable to configure the computer system to:
receive only a portion of the requested data blocks from the remote storage nodes; and
recover the entire digital file using error-correction coding associated with the received portion of the requested data blocks.

10. The computer system as recited in claim 9, wherein the executable instructions include instructions that are executable to configure the computer system to:
communicate an authentication credential to an account management server, and
after being authenticated at the account management server, receive a credential necessary for accessing the remote directory server.

11. The computer system as recited in claim 1, wherein at least a portion of the remote storage nodes comprise home-based computing devices that are each disposed within different respective houses.

12. A computer-implemented method for optimizing bandwidth usage within a local-network, comprising:
identifying, within a local-area network, one or more distinct requests to access a particular digital file, wherein:
each distinct request is associated with a different user device, and
the particular digital file is composed of multiple data blocks that are independently stored in multiple remote storage nodes, wherein the multiple remote storage nodes are remote to each other;

generating per-remote-storage-node thresholds for at least a portion of the multiple remote storage nodes, wherein a particular remote storage node selected from the multiple remote storage nodes is associated with a particular per-remote-storage-node threshold that is different than the per-remote-storage-node thresholds associated with at least one other remote storage node selection from the multiple remote storage nodes;

when a number of the one or more distinct requests exceeds the particular per-remote-storage-node threshold for the particular remote storage node, querying a remote directory server for the particular digital file;

receiving, from the remote directory server, addresses to the multiple data blocks stored within the multiple remote storage nodes, including at least the particular remote storage node;

identifying a set of slower storage nodes, including at least the particular remote storage node, selected from the multiple remote storage nodes, that are associated with slower connection speeds relative to the other remote storage nodes within the multiple remote storage nodes, wherein the set of slower storage nodes comprise a particular set of data blocks from within the multiple data blocks;

requesting, from the set of slower storage nodes, including at least the particular remote storage node, the particular set of data blocks;
storing the particular set of data blocks within local memory, wherein:
the local memory is located within the local-area network, and
the particular set of data blocks are associated with a local-area network address; and
communicating the local-area network address to the remote directory server.

13. The computer-implemented method as recited in claim 12, further comprising:
receiving a request to access the particular digital file from one or more user devices; and
transmitting the particular digital file to the one or more user devices.

14. The computer-implemented method as recited in claim 12, further comprising:
storing the particular set of data blocks within local memory;
receiving a request from a first user device to download a first subset of the multiple data blocks;
identifying the first subset within the particular set of data blocks; and
transmitting the first subset of the particular set of data blocks to the first user device.

15. The computer-implemented method as recited in claim 14, wherein:
the first user device initially downloaded a second subset of the multiple data blocks from the multiple remote storage nodes; and
data blocks within the second subset being exclusive from the one or more addressed data blocks of the first subset.

16. The computer-implemented method as recited in claim 12, wherein the digital file is decoded using a Reed-Solomon algorithm.

17. The computer-implemented method as recited in claim 12, wherein the remote directory server tracks versions associated with each block of data that is stored at each remote storage node.

18. The computer-implemented method as recited in claim 17, wherein the received addresses exclude data blocks associated with outdated versions.

19. The computer-implemented method as recited in claim 12, further comprising:
after decoding the digital file, accessing a locally stored encryption key, and
decrypt the digital file.

20. A computer program product for use at a computer system, the computer program product for optimizing bandwidth usage within a local-network, the computer program product comprising one or more non-transitory computer hardware storage media having stored thereon computer-executable instructions that, when executed at a processor, cause the computer system to perform the method, including the following:
identifying, within a local-area network, one or more distinct requests to access a particular digital file, wherein:
each distinct request is associated with a different user device, and
the particular digital file is composed of multiple data blocks that are independently stored in multiple remote storage nodes, wherein the multiple remote storage nodes are remote to each other;
generating per-remote-storage-node thresholds for at least a portion of the multiple remote storage nodes, wherein a particular remote storage node selected from the multiple remote storage nodes is associated with a particular per-remote-storage-node threshold that is different than the per-remote-storage-node thresholds associated with at least one other remote storage node selection from the multiple remote storage nodes;
when a number of the one or more distinct requests exceeds the particular per-remote-storage-node threshold for the particular remote storage node, querying a remote directory server for the particular digital file;
receiving, from the remote directory server, addresses to the multiple data blocks stored within the multiple remote storage nodes, including at least the particular remote storage node;
identifying a set of slower storage nodes, including at least the particular remote storage node, selected from the multiple remote storage nodes, that are associated with slower connection speeds relative to the other remote storage nodes within the multiple remote storage nodes, wherein the set of slower storage nodes comprise a particular set of data from within the multiple data blocks;
requesting, from the set of slower storage nodes, including at least the particular remote storage node, the particular set of data;
storing the decoded particular set of data within local memory, wherein:
the local memory is located within the local-area network, and
the particular set of data is associated with a local-area network address; and
communicating the local-area network address to the remote directory server.

* * * * *